US012658990B2

(12) United States Patent
Li et al.

(10) Patent No.: US 12,658,990 B2
(45) Date of Patent: Jun. 16, 2026

(54) TARGET TESTING BASED ON RAW UNCALIBRATED RADAR DATA

(71) Applicant: Aptiv Technologies AG, Schaffhausen (CH)

(72) Inventors: Zhengzheng Li, Agoura Hills, CA (US); Shuimei Zhang, Oak Park, CA (US); Yu Zhang, Thousand Oaks, CA (US); Xin Zhang, Agoura Hills, CA (US)

(73) Assignee: Aptiv Technologies AG, Schaffhausen (CH)

( * ) Notice: Subject to any disclaimer, the term of this patent is extended or adjusted under 35 U.S.C. 154(b) by 264 days.

(21) Appl. No.: 18/331,133

(22) Filed: Jun. 7, 2023

(65) Prior Publication Data

US 2024/0413864 A1 Dec. 12, 2024

(51) Int. Cl.
*H04W 4/00* (2018.01)
*H04B 7/0456* (2017.01)

(52) U.S. Cl.
CPC .................................. *H04B 7/0479* (2023.05)

(58) Field of Classification Search
CPC ............................ H04B 7/0479; H04B 7/0456
See application file for complete search history.

(56) References Cited

U.S. PATENT DOCUMENTS 8,638,871 B2 1/2014 Krauss et al.

9,755,712 B1 * 9/2017 Bultan ..................... H04L 5/006
10,187,134 B1 1/2019 Bialer et al.
2012/0313809 A1 12/2012 Testar et al.
(Continued)

FOREIGN PATENT DOCUMENTS

| CN | 115410386 A | 11/2022 |
| WO | 2019146644 A1 | 8/2019 |
| WO | 2022139639 A1 | 6/2022 |

OTHER PUBLICATIONS

Extended European Search Report regarding Application No. 23191250.2, dated Jan. 17, 2024.
(Continued)

*Primary Examiner* — Abdelnabi O Musa
(74) *Attorney, Agent, or Firm* — Harness, Dickey & Pierce, P.L.C.

(57) ABSTRACT

This document describes techniques and systems for target testing based on raw uncalibrated radar data. Channel responses (e.g., Raw radar data) are obtained from a sensor having a Multiple-input multiple-output (MIMO) antenna array. The channel responses, based on target detections, are arranged in a MIMO measurement matrix. The dominant singular values of the observation matrix are determined, and the quantity of dominant singular values is compared to the number of targets, either from prior information or estimated after calibration, in the FOV of the sensor. If the number of dominant singular values is different than the number of targets, either from prior information or estimated after calibration, then further analysis may be used to determine the cause of the difference. In this manner, potential damaged sensors or degradation from cover reflections may be identified, sensor status independent of calibration may be monitored, and calibration may be improved.

20 Claims, 6 Drawing Sheets

(56) References Cited

U.S. PATENT DOCUMENTS

| | | | | |
|---|---|---|---|---|
| 2013/0287131 | A1* | 10/2013 | Hart | H04B 7/0456 |
| | | | | 375/267 |
| 2019/0353751 | A1* | 11/2019 | Raphaeli | G01S 7/292 |
| 2020/0059271 | A1* | 2/2020 | Kuutela | H04B 7/0452 |
| 2020/0252056 | A1* | 8/2020 | Alsuhaili | H04B 7/0417 |
| 2021/0288699 | A1* | 9/2021 | Hirabe | H04B 17/21 |
| 2022/0214425 | A1* | 7/2022 | Yoffe | G01S 13/584 |
| 2024/0280682 | A1* | 8/2024 | Zhang | G01S 13/48 |
| 2024/0297723 | A1* | 9/2024 | Orhan | H04B 7/0868 |
| 2025/0208256 | A1* | 6/2025 | Zhang | G01S 7/40 |

OTHER PUBLICATIONS

"Extended European Search Report", EP Application No. 22166749.
6, Sep. 27, 2022, 7 pages.
Hung, "Matrix-Construction Calibration Method for Antenna Arrays",
IEEE Transactions on Aerospace and Electronic Systems, vol. 36,
No. 3, Jul. 2020, pp. 819-828.
Wang, et al., "Mutual Coupling Calibration of DBF Array With
Combined Optimization Method", IEEE Transactions on Antennas
and Propagation, vol. 51, No. 10, Oct. 2003, pp. 2947-2952.

\* cited by examiner

600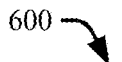

602

Receive channel responses from a sensor comprising a multiple-input multiple-output (MIMO) antenna array

604

Generate, based on the channel responses, a MIMO measurement matrix

606

Extract singular values from the MIMO measurement matrix

608

Determine, based on the singular values, a quantity of dominant singular values

610

Evaluate, based on the quantity of dominant singular values, whether the channel responses are valid

612

Responsive to the channel responses being valid, passing the sensor to be used in a real-world application

614

Responsive to the channel responses being invalid, determining a mitigation that leads to a validation of the channel responses such that the sensor can be used for a real-world application

*FIG. 6*

TARGET TESTING BASED ON RAW UNCALIBRATED RADAR DATA

BACKGROUND

Multiple-input multiple-output (MIMO) radar systems are a common approach for many radar applications. The MIMO radar systems may provide better angular discrimination of targets than non-MIMO systems by forming a large synthetic array of virtual antenna channels. However, due to different factors such as a damaged physical channel or reflections off covers (e.g., radomes, fascia) or other factors, the raw antenna ray response can be degraded. This degradation can lead to further loss of performance after the system has been calibrated.

SUMMARY

This document describes techniques and systems for target testing based on raw uncalibrated radar data. In one example, a method includes receiving uncalibrated raw channel responses from a sensor comprising an uncalibrated raw MIMO antenna array. The method further includes generating, based on the uncalibrated raw channel responses, a MIMO measurement matrix. The method further includes extracting singular values from the MIMO measurement matrix (or extracting eigen values from a covariance matrix based on the MIMO measurement matrix). The method further includes determining, based on the singular values, a quantity of dominant singular values. The method further includes evaluating, based on the quantity of dominant singular values, whether the channel responses are valid. The method further includes responsive to the channel responses being valid, passing the sensor to be used in a real-world application. The method further includes responsive to the channel responses being invalid, determining a mitigation that leads to a validation of the channel responses such that the sensor can be used for a real-world application.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

This Summary introduces simplified concepts related to target testing based on raw uncalibrated radar data, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of target testing based on raw uncalibrated radar data are described in this document with reference to the Drawings that may use same numbers to reference like features and components, and hyphenated numbers to designate variations of these like features and components. The Drawings are organized as follows:

FIG. 6 illustrates an example method for target testing a MIMO radar system based on raw uncalibrated radar data, in accordance with techniques of this disclosure.

DETAILED DESCRIPTION

Overview

MIMO radar systems are often integrated into vehicles and used in conjunction with other automotive systems to perform navigational or safety tasks. MIMO radar systems are generally better than other radar systems at detecting and tracking multiple objects. The MIMO radar systems can have a better angular resolution than other systems due to their ability to form a large synthetic array of virtual channels.

These virtual channels can be degraded by different factors such as mutual coupling among the channels or differences in length among the transmission lines associated with each physical channel. In cases such as these, calibration is often used to correct the raw antenna array response (e.g., channel response) to match an ideal array response. However, other factors may degrade the raw antenna ray responses. Radomes, fascia, or other coverings may introduce reflections of the sensor transmission signals. These reflections can mix with the reflections from targets in the field-of-view (FOV) of the sensor leading to degraded performance even after the sensor has been calibrated.

This document describes techniques and systems for target testing based on raw uncalibrated radar data. Channel responses (e.g., Raw radar data) are obtained from a sensor having a Multiple-input multiple-output (MIMO) antenna array. The channel responses, based on target detections, are arranged in a MIMO measurement matrix. The dominant singular values of the observation matrix are determined, and the quantity of dominant singular values is compared to the number of targets, either from prior information or estimated after calibration, in the FOV of the sensor. If the number of dominant singular values is different than the number of targets, either from prior information or estimated after calibration, then further analysis may be used to determine the cause of the difference. In this manner, potential damaged sensors or degradation from cover reflections may be identified, sensor status independent of calibration may be monitored, and calibration may be improved.

Example Environment

Figure 1:
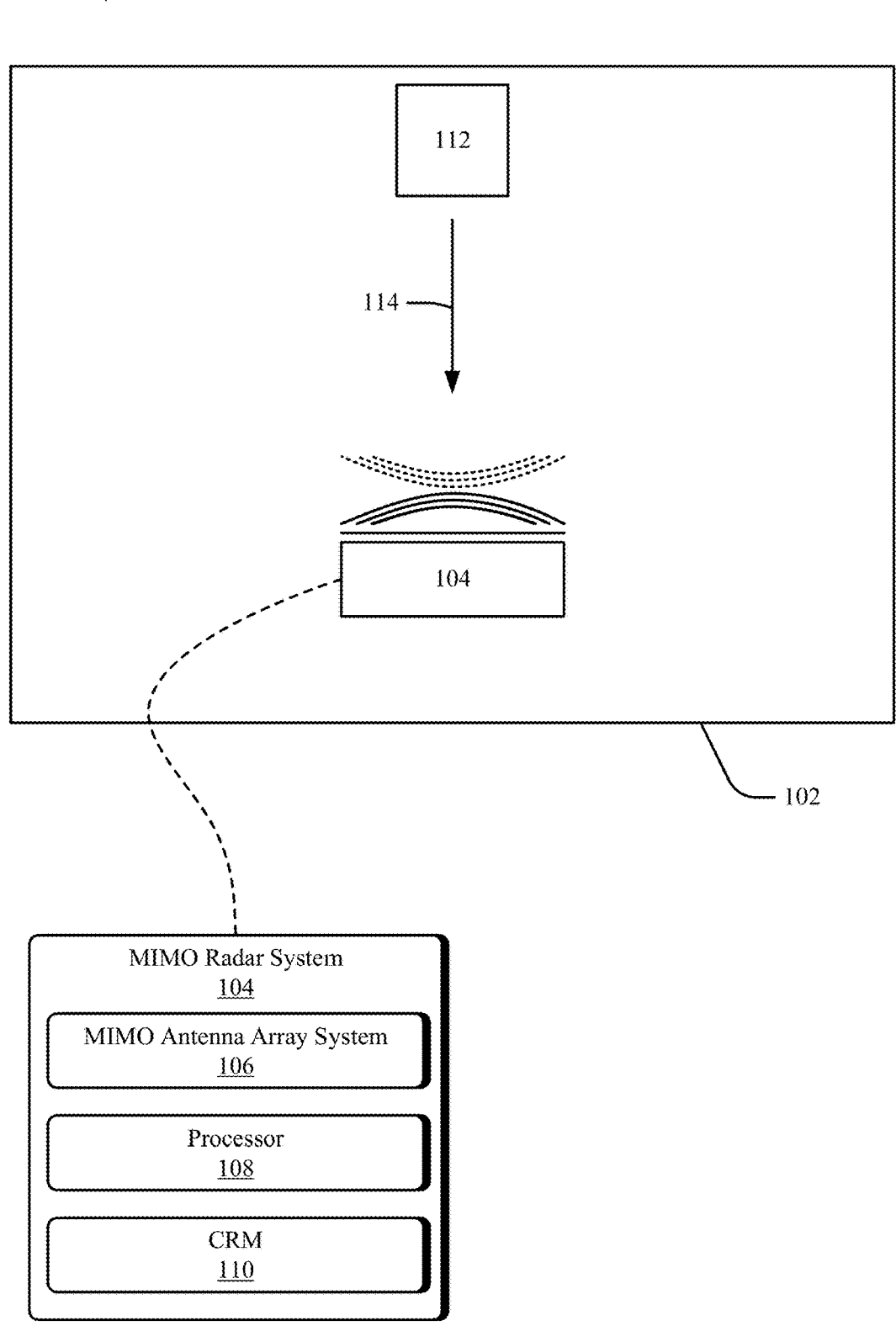
FIG. 1 illustrates an example environment in which target testing based on raw uncalibrated radar data for a MIMO radar system can be applied, in accordance with techniques of this disclosure.

FIG. 1 illustrates an example environment 100 in which target testing based on raw uncalibrated radar data for a MIMO radar system 104 can be applied, in accordance with techniques of this disclosure. Environment 100 includes a testing chamber 102 for target testing the MIMO radar system 104. Likewise, other environments may be used as an alternative to the testing chamber 102. Any environment conducive to testing a MIMO radar system 104 can be used. Additionally, the MIMO radar system 104 may be tested as a standalone system or as a system installed in a vehicle.

The MIMO radar system 104 can be mounted to any platform. For example, manufacturers can integrate features of the MIMO radar system 104, such as one or more radar sensors, into a side mirror, roof, bumper, or any other interior or exterior location of a vehicle (e.g., the vehicle 204 illustrated in FIG. 2) that travels a road where the FOV includes the road and any targets, moving or stationary, that are near the road. The vehicle can represent different types of motorized vehicles (e.g., car, truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The MIMO radar system 104 includes hardware that may include a MIMO antenna array system 106, a processor 108 and a computer-readable storage medium (CRM) 110. The MIMO radar system 104 transmits and receives electromagnetic signals via the MIMO antenna array system 106. The MIMO antenna array system 106 includes transmit components and receive components. The transmit components may include one or more transmit antennas (e.g., transmit channels), one or more transmitters, and the circuitry that couples the transmit antennas to the transmitters. Likewise, the receive components may include one or more receive antennas (e.g., receive channels), one or more receivers, and the circuitry that couples the receive antennas to the receivers. The MIMO antenna array system 106 is described with more detail in relation to FIG. 3.

The processor 108 can be multiple separate or a single microprocessor, one or more system-on-chips of a computing device, a controller, or a control unit. The processor 108 executes computer-executable instructions stored within the CRM 110. The CRM 110 can store machine-readable instructions that, when executed by the processor 108 or other logic of the MIMO radar system 104, cause the processor 108 or other logic to transmit and receive electromagnetic energy to detect and identify objects, such as one or more targets 112 (e.g., an actual target 112, a known target 112). The MIMO radar system 104 may include a combination of hardware, software, and/or firmware for detecting objects, such as, for an automotive system.

At least one target 112 can be present in the testing chamber 102. Although, this document describes the techniques and systems primarily in relation to a single target 112, multiple targets 112 may be used for similar results. The MIMO radar system 104 transmits an electromagnetic beam (e.g., a beam vector) and receives the reflected beam by the target 112 as channels response 114. Each virtual transmit-receive channel of the MIMO radar system 104 has an associated uncalibrated raw channel response 114. For example, channel response 114 is a plurality of channel responses, and the quantity of channel responses is equal to the quantity of virtual transmit-receive channels of the MIMO radar system 104.

Figure 2:
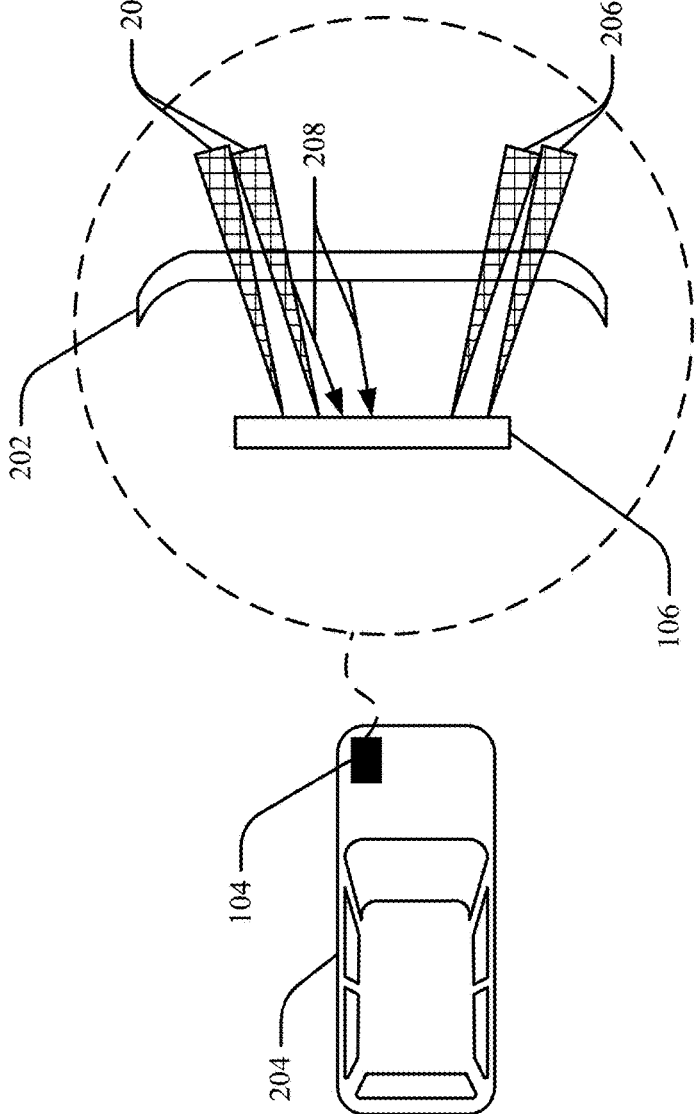
FIG. 2 illustrates a scenario in which in which target testing based on raw uncalibrated radar data may be applicable for a MIMO radar system having a cover and integrated into a vehicle, in accordance with techniques of this disclosure.
Figure 2:

In addition to the beam reflected by the target 112, the channel response 114 may include reflections from a cover 202 adjacent to the MIMO antenna array system 106. FIG. 2 illustrates a scenario 200 in which in which target testing based on raw uncalibrated radar data may be applicable for the MIMO radar system 104 having the cover 202 and integrated into the vehicle 204, in accordance with techniques of this disclosure.

The MIMO antenna array system 106 of the MIMO radar system 104 can transmit signals 206 and receive signals (not illustrated) from one or more objects (e.g., the target(s) 112). Additionally, the cover 202 (e.g., a radome, a fascia, water/ice buildup on surface of radome/fascia) may induce one or more reflections 208. The reflections 208 can mix with the signals reflected from objects and are included in the received channel responses of the MIMO antenna array system 106. The reflections 208 can cause the MIMO radar system 104 to detect false positives, that is, perceive (e.g., detect) additional targets that are not actually in the FOV of the MIMO radar system 104. The reflections 208 can lead to degraded calibrated performance or overfitting related to the MIMO radar system 104. The techniques and systems as described herein may identify and assist in finding mitigation techniques to overcome the degradation of the MIMO radar system 104 due to the reflections 208 or other problems that may be associated with the MIMO radar system 104.

Example Systems

Figure 3:
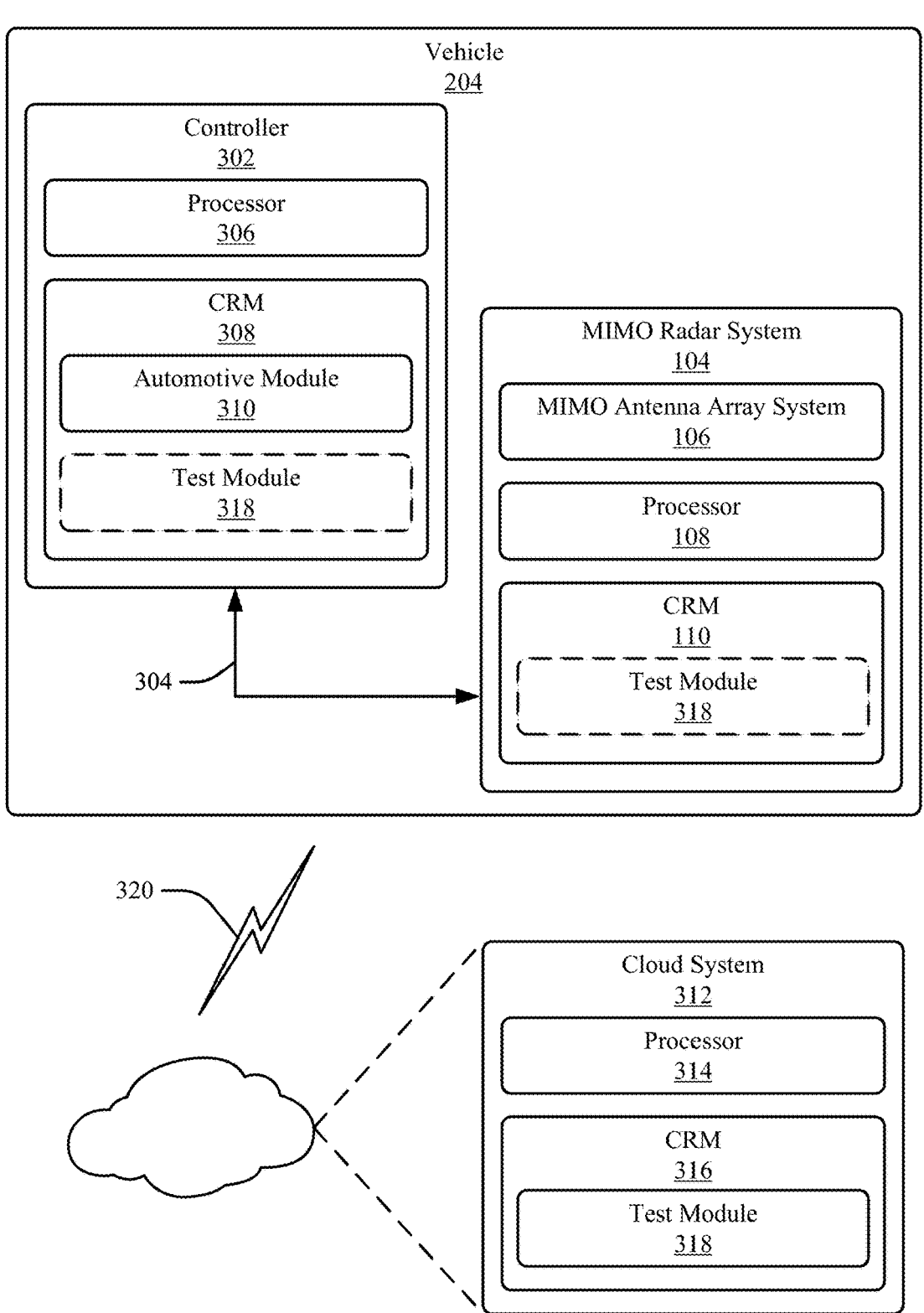
FIG. 3 illustrates the example vehicle in which target testing based on raw uncalibrated radar data can be applied, in accordance with the techniques of this disclosure.

FIG. 3 illustrates the example vehicle 204 in which target testing based on raw uncalibrated radar data can be applied, in accordance with the techniques of this disclosure. The vehicle 204 includes a controller 302 and the MIMO radar system 104. The MIMO radar system 104 can be tested using the techniques described herein. The controller 302 and the MIMO radar system 104 communicate over a link 304. The link 304 may be a wired or wireless link and, in some cases, includes a communication bus. The controller 302 performs operations based on information received from the MIMO radar system 104, over the link 304, such as data output from the MIMO radar system 104, including information indicative of one or more objects identified and tracked in an FOV.

The controller 302 includes a processor 306 and a CRM 308, which stores instructions for an automotive module 310. The processor 306 can execute the automotive module 310 to perform a driving function or other operation of the vehicle 204, which may include using output from the MIMO radar system 104 to assist in determining driving decisions. For example, the automotive module 310 can provide automatic cruise control and monitor the MIMO radar system 104 for output that indicates the presence of objects in the FOV, for instance, to slow the speed and prevent a collision with a vehicle or a pedestrian. The automotive module 310 may provide alerts or perform a specific maneuver when the data obtained from the MIMO radar system 104 indicates that one or more objects are crossing in front of the vehicle 204.

FIG. 3 also illustrates a cloud system 312 including at least one processor 314 and a CRM 316. The cloud system 312 can be any computer system external to the vehicle 204 and/or the MIMO radar system 104 and can be used to perform testing based on the techniques described herein. The cloud system can communicate to the vehicle 204 and/or the MIMO radar system 104 through a cloud link 320 that may be a wired or wireless link (e.g., through the "cloud").

The CRM 316 stores a test module 318. The test module 318 includes a set of instructions that configure the processor 314 to perform, on the MIMO radar system 104, target testing based on raw uncalibrated radar data. The test module 318 receives raw channel responses (e.g., before significant processing of the channel responses) from the MIMO radar system 104. The test module 318 can organize the channel responses into an uncalibrated raw MIMO measurement matrix (e.g., observation matrix, raw antenna response matrix). The test module extracts the singular values from the MIMO measurement matrix using singular value decomposition or other methods. The dominant singular values can then be determined from the singular values using different processes. Alternatively, the eigenvalues of a covariance matrix derived from the MIMO measurement matrix can be calculated and used in place of the dominant singular values. The number of targets in the FOV of the MIMO radar system (for some applications, such as in chamber, the number is known as prior information, for some applications, the number can be estimated after calibration) should be equal to the number of dominant singular values derived from the MIMO measurement matrix. If they are not equal, then further analysis can be performed to determine whether the channel responses include reflections off a cover or if the MIMO radar system 104 is damaged. This testing may also be used to monitor radar status or blockage independent of calibration, finding a true raw single target measurement for online calibration, and evaluating the quality of the raw radar measurements and finding root causes of bad calibrations (e.g., nearfield chamber calibration, misalignment analysis, and the like). For example, if the quantity of dominant singular values, based on calibrated raw channel responses in this example, is different than a quantity of targets detected by a calibrated sensor, then an online calibration can be applied to the sensor to improve performance.

Although illustrated in this manner, the test module 318 may, alternatively, be stored in the CRM 110 and/or 308. Further, the test module 318 can be performed on any MIMO radar system 104 that is integrated in the vehicle 204 or that has not been installed on a platform. The test module 318 may also perform the testing based on a single target or on multiple targets in the FOV of the MIMO radar system 104.

Figure 4:
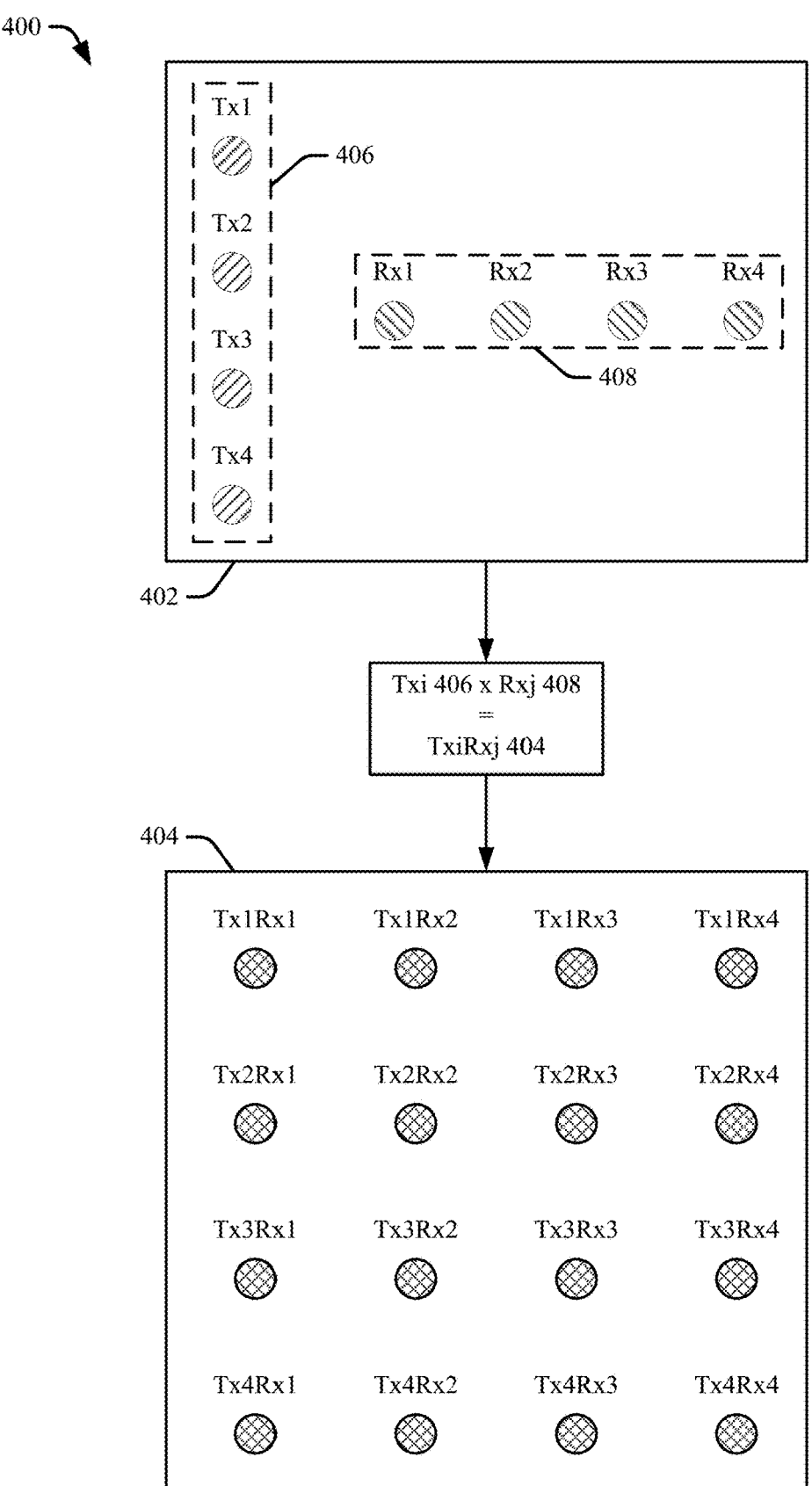
FIG. 4 illustrates a relationship between physical channels and virtual channels for target testing a MIMO radar system based on raw uncalibrated radar data, in accordance with techniques of this disclosure.

FIG. 4 illustrates a relationship 400 between physical channels 402 and virtual channels 404 for target testing a MIMO radar system based on raw uncalibrated radar data, in accordance with techniques of this disclosure. The physical channels 402 comprise one or more physical transmit (TX) channels 406 and one or more physical receive (RX) channels 408. In this example, there are four physical transmit channels (Tx1 through Tx4) 406 and four physical receive channels (Rx1 through Rx4); however, a quantity of physical transmit channels 406 and a quantity of physical receive channels 408 can be any quantity. Further, the physical transmit channels 406 and the physical receive channels 408 can be equal quantities or different quantities.

A quantity of virtual (transmit-receive) channels 404 is determined by multiplying the quantities of physical transmit channels 406 and physical receive channels 408. For example, FIG. 4 illustrates sixteen virtual channels 404 (Tx1Rx1 through Tx4Rx4), which is the product of the four physical transmit channels 406 and four physical receive channels 408.

The channel response of each virtual channel 404 measures a round trip of the electromagnetic energy transmitted and received by the associated physical transmit and receive channels for that virtual channel. Therefore, the channel response of each virtual channel 404 includes a transmit component and a receive component for mutual coupling that is equal to the mutual coupling between the associated physical transmit channel 406 and the physical receive channel 408. For example, the mutual coupling of the virtual channel Tx2Rx2 is affected by the physical neighboring channels of Tx2 and Rx2, and the mutual coupling of the virtual channel Tx3Rx2 is affected by the physical neighboring channels of Tx3 and Rx2. The receive component of the mutual coupling of these two virtual channels is the same (the mutual coupling component due to Rx2), but the transmit component of the mutual coupling of these two virtual channels is different. Tx2Rx2 has transmit component associated with Tx2, and Tx3Rx2 has a transmit component associated with Tx3. Further, neighboring virtual channels 404 (e.g., Tx2Rx2 and Tx3Rx2) can have a greater combined mutual coupling than virtual channels that are further apart (e.g., Tx1Rx1 and Tx4Rx4).

For a MIMO radar system with N transmit channels and M receive channels, assuming $a(\theta)$ is the ideal synthetic array response for a single target at angle $\theta$, $$a(\theta) = vec\left(a_t(\theta) \cdot a_r(\theta)^T\right) = vec\left(\begin{bmatrix} a_{11} & a_{12} & \cdots & a_{1M} \\ a_{21} & a_{22} & \cdots & a_{2M} \\ \vdots & \vdots & \ddots & \vdots \\ a_{N1} & a_{N2} & \cdots & a_{NM} \end{bmatrix}\right) \rightarrow vec(A(\theta)) \quad (1)$$

where $a_t(\theta)$ and $a_r(\theta)$ are ideal steering vectors for Tx and Rx. Vec(:) is the vectorize operation. The matrix $A(\theta)$ is a rank one matrix because it is a product of two vectors, as shown in Equation 2:

$$A(\theta) = a_t(\theta) \cdot a_r(\theta)^T \quad (2)$$

The raw antenna response (e.g., the raw uncalibrated channel responses), $x(\theta)$, can be rewritten as an N×M matrix $X(\theta)$:

$$X(\theta) = \begin{bmatrix} x_{11} & x_{12} & \cdots & x_{1M} \\ x_{21} & x_{22} & \cdots & x_{2M} \\ \vdots & \vdots & \ddots & \vdots \\ x_{N1} & x_{N2} & \cdots & x_{NM} \end{bmatrix} \quad (3)$$

The raw antenna response data matrix, $X(\theta)$ (e.g., the MIMO measurement matrix), is often full rank. For $X(\theta)$ to be rank 1, mutual couplings between the TX antennas and the RX antennas need to be negligible, and only mutual couplings exist among the TX antennas themselves and among the RX antennas themselves. This condition is usually true for frequency modulated continuous wave radar systems where transmit and receive isolation is an important requirement in the antenna and system design. Otherwise, the lack of isolation may lead to an increased noise floor and reduced sensitivity.

Ideally, a raw measurement matrix for a single target can be approximated as a rank 1 matrix and be written as:

$$C_t \cdot X(\theta) \cdot C_r^T \approx A(\theta) \quad (4)$$

where $C_t$ is a transmit calibration matrix with full rank and $$C_r^T$$

is a receive calibration matrix with full rank.

X(θ) can be written as $$X(\theta) = a_t(\theta) \cdot a_r(\theta)^T \cdot s + M + n \qquad (5)$$

where s are the singular values, M is the mutual couplings between the TX and RX antennas and n is the measurement noise. Assuming M and n are negligible, for singular value decomposition and assuming X(θ) is from a single target measurement, then ideally:

$$X(\theta) = U \sum V^H \approx \sigma_1 u_1 v_1^H \qquad (6)$$

Thus, for X(θ) to be rank 1, there should be one dominant singular value. It should be noted that for multiple targets at different angles, there should be a dominant singular value (e.g., or an eigenvalue) corresponding to each target. For example, for raw measurements having multiple targets at different angles:

$$Y = X(\theta_1) + X(\theta_2) + \dots X(\theta_N) \qquad (7)$$

Ignoring mutual coupling between the TX and RX antennas:

$$Y = a_t(\theta_1) \cdot a_r(\theta_1)^T \cdot s_1 + a_t(\theta_2) \cdot a_r(\theta_2)^T \cdot s_2 + \dots a_t(\theta_N) \cdot a_r(\theta_N)^T \cdot s_N \qquad (8)$$

Then equation 9 can be derived:

$$Y = [a_t(\theta_1) a_t(\theta_2) \dots a_t(\theta_N)] \cdot \begin{bmatrix} s_1 & & & \\ & s_2 & & \\ & & \ddots & \\ & & & s_N \end{bmatrix} \cdot \begin{bmatrix} a_r(\theta_1)^T \\ a_r(\theta_2)^T \\ \vdots \\ a_r(\theta_N)^T \end{bmatrix} \qquad (9)$$

From equation 9, it can be seen that the rank of Y is more than 1 and there are N dominant singular values for measurement from N targets at different angles.

To determine whether a singular value is a dominant singular value, several different types of analysis may be conducted on the singular values. Some methods compare the ratios of the singular values to the sum of all the singular values (e.g., weighted average):

$$\frac{s_1}{\sum (s_1, s_2, \dots, s_N)}$$

or the ratio of one singular value to the next singular value:

$$\frac{s_1}{s_2},$$

$$\frac{s_2}{s_3}$$

These ratios may be further compared to a threshold amount to determine whether the singular value is dominant. The correlation between the original beam vector (e.g., measurement vector) and the reconstructed beam vector from the dominant singular vector may be analyzed. Or other statistical models may be used to find the dominant singular values such as Akaike information criterion (AIC), Bayesian information criterion (BIC), and minimum description length (MDL).

From these equations, a MIMO radar system can be tested based on its raw channel responses. If the quantity of dominant singular values equals the number of targets, either from prior information or estimated after calibration, in the FOV of the MIMO radar system, then the MIMO radar system passes the test, and the channel responses are valid. If the quantity of dominant singular values does not equal the number of targets, either from prior information or estimated after calibration, in the FOV of the MIMO radar system, then the channel responses are not valid, and further analysis can be performed and mitigation techniques to overcome the inaccuracy of the MIMO radar system may be pursued. Based on the channel responses being valid, the sensor may be used in a real-world application (e.g., deployed into the field).

Example Implementations

Figure 5:
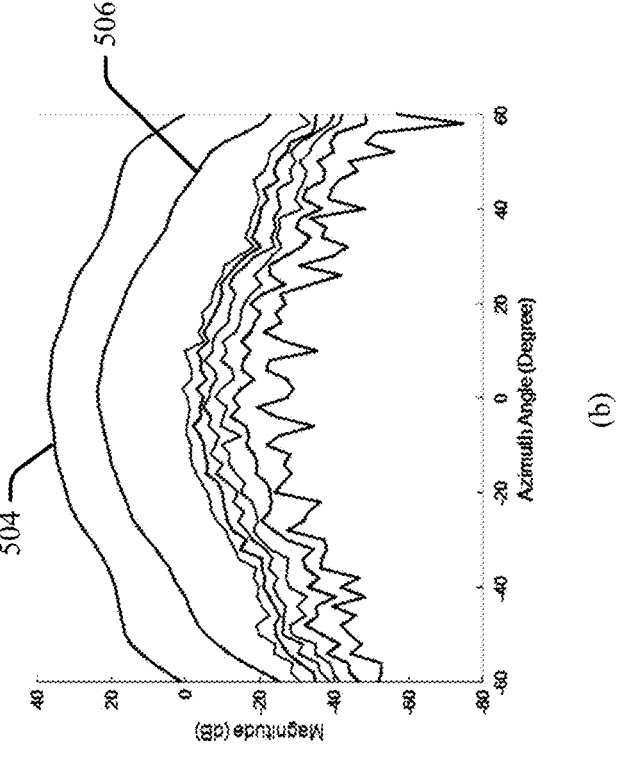
FIG. 5 illustrates two graphs representing a single target result and a multiple target result from target testing a MIMO radar system based on raw uncalibrated radar data, in accordance with techniques of this disclosure.
Figure 5:
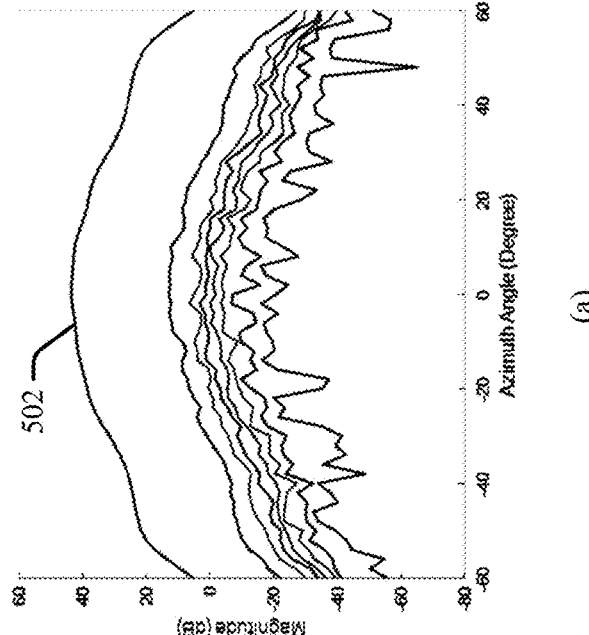

FIG. 5 illustrates two graphs representing a single target result (graph (a)) and a multiple target result (graph (b)) from target testing a MIMO radar system based on raw uncalibrated radar data, in accordance with techniques of this disclosure. In graph (a), one target represented by the curve 502 can be determined. The other curves in graph (a) have a magnitude much closer to zero and can be assumed to be noise or other irrelevant indications. For example, if this test was performed on a MIMO radar system with a cover, any reflections from the cover may not be adversely affecting the MIMO radar system.

Graph (b) illustrates two dominate curves, curve 504 and 506. Continuing the same assumptions as for graph (a), if this graph was generated based on one actual target (e.g., represented by curve 504) in the FOV, then the second perceived target (e.g., represented by the curve 506) may prove that the MIMO radar system is being degraded due to reflections from the cover or some other issue related to the MIMO radar system. However, if two known targets are in the FOV of the MIMO radar system, then the MIMO radar system would pass the test and the channel responses that represent the curves 504 and 506 are valid. In this manner, a MIMO radar system may be tested, based on raw channel responses, to determine the effects of covers or blockage, to identify bad units, or to set a baseline for the raw channel responses prior to calibration.

Example Methods

FIG. 6 illustrates an example method 600 for target testing a MIMO radar system based on raw uncalibrated radar data, in accordance with techniques of this disclosure. Method 600 is shown as sets of operations (or acts) performed, but not necessarily limited to the order or combinations in which the operations are shown herein. Further, any of one or more of the operations may be repeated, combined, or reorganized to provide other methods.

At 602, uncalibrated raw channel responses from a sensor including a MIMO antenna array are received by a computing unit. The computing unit may be a testing computer, or it may be part of the sensor system or another system communicatively connected to the sensor system. The channel responses can be raw antenna responses that include detections made by the sensor.

At 604, an uncalibrated raw MIMO measurement matrix (e.g., the raw antenna response data matrix, $X(\theta)$) is generated based on the channel responses. Each of the elements of the MIMO measurement matrix corresponds to a virtual channel formed by the MIMO antenna array as part of a synthetic array aperture. That is, for N transmit channels and M receive channels, there can be N times M virtual channels, and the MIMO measurement matrix can have the dimensions of N×M.

At 606, singular values are extracted from the MIMO measurement matrix. The singular values may be factored based on singular value decomposition.

At 608, a quantity of dominant singular values is determined from the set of singular values that were extracted at 606. Alternatively, the eigenvalues of a covariance matrix derived from the MIMO measurement matrix can be determined and used in place of the dominant singular values for the target test. The dominant singular values may be determined based on different statistical models. For example, simple statistical models may be used such as comparing a weighted average of each singular value to a threshold or comparing a singular value to the next singular value. Another method may analyze the correlation between the original beam vector and the reconstructed beam vector from the dominant singular vector. More complex statistical models may, likewise, be used such as AIC, BIC, or MDL. These statistical models may be analyzed alone or in combination with one another.

At 610, the quantity of dominant singular values is evaluated to determine whether the channel responses are valid. That is, ideally, the quantity of dominant singular values should equal the number of actual targets in the FOV of the sensor which is either known as prior information or estimated after calibration. For a single target test, the quantity of dominant singular values should be one. If multiple targets (e.g., actual targets) are in the FOV, then the quantity of singular values should be equal to the number of multiple targets, and if they are equal, the channel responses are considered valid. If the quantity of singular values is not equal to the number of targets, then the channel responses can be determined to be invalid. Some reasons why the quantity of singular values would not be equal to the number of multiple targets is that the channel responses may include reflections from a cover (e.g., a radome, a fascia) over the MIMO antenna array of the sensor, or the sensor may be damaged.

At 612, the sensor is deemed to have passed the target test if the channel responses are valid. The sensor can then be used in a real-world application (e.g., deployed into the field). Other applications are calibration of the sensor, evaluating the raw sensor measurements, and online calibration.

At 614, the sensor is deemed to have not passed the target test if the channel responses are invalid. Mitigation may be determined that may validate the channel responses. In the example of determining that the invalid channel responses are due to degradation related to reflections from the cover, techniques may be applied to reduce the reflections or otherwise filter them out. In some cases, including the sensor being determined to be a bad unit, the sensor may be repaired or discarded. In other cases, the invalid channel responses may reveal that the sensor had a bad calibration applied to it, and the channel responses may assist in finding the root cause of the bad calibration, and in some cases, improve calibration performance through online calibration.

ADDITIONAL EXAMPLES

Some additional examples for target testing a MIMO radar system based on raw uncalibrated radar data are provided below.

Example 1: A system comprising: at least one processor configured to: receive channel responses from a sensor comprising a multiple-input multiple-output (MIMO) antenna array; generate, based on the channel responses, a MIMO measurement matrix; extract singular values from the MIMO measurement matrix; determine, based on the singular values, a quantity of dominant singular values; evaluate, based on the quantity of dominant singular values, whether the channel responses are valid; responsive to the channel responses being valid, pass the sensor to be used in a real-world application; and responsive to the channel responses being invalid, determine a mitigation that leads to a validation of the channel responses such that the sensor can be used for a real-world application.

Example 2: The system of example 1, wherein the received channel responses comprise channel responses of a plurality of virtual channels.

Example 3: The system of any one of the previous examples, wherein elements of the MIMO measurement matrix correspond to respective channel responses.

Example 4: The system of any one of the previous examples, wherein the processor is configured to extract singular values from the MIMO measurement matrix by at least: factoring the MIMO measurement matrix based on singular value decomposition; or calculating eigenvalues of a covariance matrix derived from the MIMO measurement matrix.

Example 5: The system of any one of the previous examples, wherein the processor is configured to determine the quantity of dominant singular values by at least: comparing a weighted average of each singular value to a threshold amount; comparing a ratio of a first singular value and a second singular value to threshold value; evaluating a correlation between an original beam vector (measurement vector) associated with the sensor and a beam vector reconstructed from a singular value; analyzing based on a Akaike Information Criterion statistical model; analyzing based on a Bayesian Information Criterion statistical model; or analyzing based on a Minimum description Length statistical model.

Example 6: The system of any one of the previous examples, wherein the quantity of dominant singular values corresponds to a number of perceived targets being detected by the sensor.

Example 7: The system of any one of the previous examples, wherein the processor is configured to evaluate whether the channel responses are valid by at least: comparing the quantity of dominant singular values to a known number of targets in a field of view of the sensor; determining that the channel responses are valid if the quantity of dominant singular values is equal to the known number of targets; and determining that the channel responses are invalid if the quantity of dominant singular values is not equal to the known number of targets.

Example 8: The system of any one of the previous examples, wherein the mitigation includes reducing effects due to reflections from a cover of the sensor.

Example 9: The system of any one of the previous examples, wherein the processor is configured to: evaluate whether the channel responses are valid by at least comparing the quantity of dominant singular values to an estimated quantity of detected targets after a calibration of the sensor; responsive to the quantity of dominant singular values not being equal to the estimated quantity of detected targets after the calibration of the sensor, determine that the channel responses are invalid; and responsive to the channel responses being invalid, perform, based on a difference between the quantity of dominant singular values and the estimated quantity of detected targets, an online calibration of the sensor.

Example 10: A method comprising: receiving channel responses from a sensor comprising a multiple-input multiple-output (MIMO) antenna array; generating, based on the channel responses, a MIMO measurement matrix; extracting singular values from the MIMO measurement matrix; determining, based on the singular values, a quantity of dominant singular values; evaluating, based on the quantity of dominant singular values, whether the channel responses are valid; and responsive to the channel responses being valid, passing the sensor to be used in a real-world application.

Example 11: The method of any one of the previous examples, wherein the received channel responses comprise channel responses of a plurality of virtual channels.

Example 12: The method of any one of the previous examples, wherein elements of the MIMO measurement matrix correspond to respective channel responses.

Example 13: The method of any one of the previous examples, wherein extracting singular values from the MIMO measurement matrix comprises: factoring the MIMO measurement matrix based on singular value decomposition; or calculating eigenvalues of a covariance matrix derived from the MIMO measurement matrix.

Example 14: The method of any one of the previous examples, wherein determining the quantity of dominant singular values comprises: comparing a weighted average of each singular value to a threshold amount; comparing a ratio of a first singular value and a second singular value to threshold value; evaluating a correlation between an original beam vector associated with the sensor and a beam vector reconstructed from a singular value; analyzing based on a Akaike Information Criterion statistical model; analyzing based on a Bayesian Information Criterion statistical model; or analyzing based on a Minimum description Length statistical model.

Example 15: The method of any one of the previous examples, wherein the quantity of dominant singular values corresponds to a number of perceived targets being detected by the sensor.

Example 16: The method of any one of the previous examples, wherein evaluating whether the channel responses are valid comprises: comparing the quantity of dominant singular values to a known number of targets in a field of view of the sensor.

Example 17: The method of any one of the previous examples, further comprising: determining that the channel responses are valid if the quantity of dominant singular values is equal to the known number of targets.

Example 18: The method of any one of the previous examples further comprising: determining that the channel responses are invalid if the quantity of dominant singular values is not equal to the known number of targets.

Example 19: The method of any one of the previous examples, wherein responsive to the channel responses being invalid, determining a mitigation that leads to a validation of the channel responses such that the sensor can be used for a real-world application.

Example 20: A computer-readable media comprising instruction that, when executed cause a processor to: receive channel responses from a sensor comprising a multiple-input multiple-output (MIMO) antenna array; generate, based on the channel responses, a MIMO measurement matrix; extract singular values from the MIMO measurement matrix; determine, based on the singular values, a quantity of dominant singular values; evaluate, based on the quantity of dominant singular values, whether the channel responses are valid; responsive to the channel responses being valid, pass the sensor to be used in a real-world application; and responsive to the channel responses being invalid, determine a mitigation that leads to a validation of the channel responses such that the sensor can be used for a real-world application.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with raw channel responses can occur in other systems. Therefore, although described as a way to test the channel responses of a radar system, the techniques of the foregoing description can be applied to other systems that would benefit from analyzing raw channel responses. Further, these techniques may also be applied to other systems utilizing a MIMO antenna array.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
   at least one processor configured to:
      receive uncalibrated raw channel responses from a sensor comprising a multiple-input multiple-output (MIMO) antenna array;
      generate, based on the uncalibrated raw channel responses, an uncalibrated raw MIMO measurement matrix;
      extract singular values from the MIMO measurement matrix;
      determine, based on the singular values, a quantity of dominant singular values;
      evaluate, based on the quantity of dominant singular values, whether the channel responses are valid;
      responsive to the channel responses being valid, pass the sensor to be used in a real-world application; and
      responsive to the channel responses being invalid, determine a mitigation that leads to a validation of the channel responses such that the sensor can be used for a real-world application.

2. The system of claim 1, wherein the received channel responses comprise channel responses of a plurality of virtual channels.

3. The system of claim 1, wherein elements of the MIMO measurement matrix correspond to respective channel responses.

4. The system of claim 1, wherein the processor is configured to extract singular values from the MIMO measurement matrix by at least:

factoring the MIMO measurement matrix based on singular value decomposition; or calculating eigenvalues of a covariance matrix derived from the MIMO measurement matrix.

5. The system of claim 1, wherein the processor is configured to determine the quantity of dominant singular values by at least:

comparing a weighted average of each singular value to a threshold amount;

comparing a ratio of a first singular value and a second singular value to threshold value;

evaluating a correlation between an original beam vector associated with the sensor and a beam vector reconstructed from a singular value;

analyzing based on a Akaike Information Criterion statistical model;

analyzing based on a Bayesian Information Criterion statistical model; or analyzing based on a Minimum description Length statistical model.

6. The system of claim 1, wherein the quantity of dominant singular values corresponds to a number of perceived targets being detected by the sensor.

7. The system of claim 1, wherein the processor is configured to evaluate whether the channel responses are valid by at least:

comparing the quantity of dominant singular values to a known number of targets in a field of view of the sensor;

determining that the channel responses are valid in response to the quantity of dominant singular values being equal to the known number of targets; and determining that the channel responses are invalid in response to the quantity of dominant singular values not being equal to the known number of targets.

8. The system of claim 1, wherein the mitigation includes reducing effects due to reflections from a cover of the sensor.

9. The system of claim 1, wherein the processor is further configured to:

receive calibrated raw channel responses from the sensor;

evaluate whether the calibrated raw channel responses are valid by at least comparing the quantity of dominant singular values to an estimated quantity of detected targets after a calibration of the sensor;

responsive to the quantity of dominant singular values not being equal to the estimated quantity of detected targets after the calibration of the sensor, determine that the calibrated raw channel responses are invalid; and responsive to the calibrated raw channel responses being invalid, perform, based on a difference between the quantity of dominant singular values and the estimated quantity of detected targets, an online calibration of the sensor.

10. A method comprising:

receiving uncalibrated raw channel responses from a sensor comprising a multiple-input multiple-output (MIMO) antenna array;

generating, based on the uncalibrated raw channel responses, an uncalibrated raw MIMO measurement matrix;

extracting singular values from the MIMO measurement matrix;

determining, based on the singular values, a quantity of dominant singular values;

evaluating, based on the quantity of dominant singular values, whether the channel responses are valid; and responsive to the channel responses being valid, passing the sensor to be used in a real-world application.

11. The method of claim 10, wherein the received channel responses comprise channel responses of a plurality of virtual channels.

12. The method of claim 10, wherein elements of the MIMO measurement matrix correspond to respective channel responses.

13. The method of claim 10, wherein extracting singular values from the MIMO measurement matrix comprises:

factoring the MIMO measurement matrix based on singular value decomposition; or calculating eigenvalues of a covariance matrix derived from the MIMO measurement matrix.

14. The method of claim 10, wherein determining the quantity of dominant singular values comprises:

comparing a weighted average of each singular value to a threshold amount;

comparing a ratio of a first singular value and a second singular value to threshold value;

evaluating a correlation between an original beam vector associated with the sensor and a beam vector reconstructed from a singular value;

analyzing based on a Akaike Information Criterion statistical model;

analyzing based on a Bayesian Information Criterion statistical model; or analyzing based on a Minimum description Length statistical model.

15. The method of claim 10, wherein the quantity of dominant singular values corresponds to a number of perceived targets being detected by the sensor.

16. The method of claim 10, wherein evaluating whether the channel responses are valid comprises:

comparing the quantity of dominant singular values to a known number of targets in a field of view of the sensor.

17. The method of claim 16, further comprising:

determining that the channel responses are valid in response to the quantity of dominant singular values being equal to the known number of targets.

18. The method of claim 16 further comprising:

determining that the channel responses are invalid in response to the quantity of dominant singular values is not equal to the known number of targets.

19. The method of claim 18, wherein responsive to the channel responses being invalid, determining a mitigation that leads to a validation of the channel responses such that the sensor can be used for a real-world application.

20. A non-transitory computer-readable medium comprising instruction that, when executed cause a processor to:

receive uncalibrated raw channel responses from a sensor comprising a multiple-input multiple-output (MIMO) antenna array;

generate, based on the uncalibrated raw channel responses, an uncalibrated raw MIMO measurement matrix;

extract singular values from the MIMO measurement matrix;

determine, based on the singular values, a quantity of dominant singular values;

evaluate, based on the quantity of dominant singular values, whether the channel responses are valid;

responsive to the channel responses being valid, pass the sensor to be used in a real-world application; and responsive to the channel responses being invalid, determine a mitigation that leads to a validation of the channel responses such that the sensor can be used for a real-world application.

\* \* \* \* \*